(12) United States Patent
Miyauchi et al.

(10) Patent No.: US 11,599,791 B2
(45) Date of Patent: Mar. 7, 2023

(54) LEARNING DEVICE AND LEARNING METHOD, RECOGNITION DEVICE AND RECOGNITION METHOD, PROGRAM, AND STORAGE MEDIUM

(71) Applicant: NEC Solution Innovators, Ltd., Tokyo (JP)

(72) Inventors: Yoshihito Miyauchi, Tokyo (JP); Akio Uda, Tokyo (JP); Katsuhiro Nakade, Tokyo (JP)

(73) Assignee: NEC Solution Innovators, Ltd., Tokyo (JP)

( * ) Notice: Subject to any disclaimer, the term of this patent is extended or adjusted under 35 U.S.C. 154(b) by 322 days.

(21) Appl. No.: 16/648,807

(22) PCT Filed: Nov. 20, 2018

(86) PCT No.: PCT/JP2018/042781
§ 371 (c)(1),
(2) Date: Mar. 19, 2020

(87) PCT Pub. No.: WO2019/102984
PCT Pub. Date: May 31, 2019

(65) Prior Publication Data
US 2020/0285957 A1    Sep. 10, 2020

(30) Foreign Application Priority Data

Nov. 22, 2017 (JP) .............................. JP2017-224329

(51) Int. Cl.
*G06N 3/08* (2006.01)
*G06N 3/00* (2006.01)
*G06N 3/04* (2023.01)

(52) U.S. Cl.
CPC ................. *G06N 3/08* (2013.01); *G06N 3/04* (2013.01)

(58) Field of Classification Search
CPC .................................. G06N 3/00; G06N 3/08
See application file for complete search history.

(56) References Cited

U.S. PATENT DOCUMENTS

2016/0189010 A1    6/2016 Tang et al.
2018/0121796 A1 *  5/2018 Deisher ................ G06N 3/0472
(Continued)

FOREIGN PATENT DOCUMENTS

CN    101713321 B  *  9/2014    ........... F02D 35/026
CN    108475264 A  *  8/2018    ......... G06F 17/2785
(Continued)

OTHER PUBLICATIONS

International Search Report for PCT Application No. PCT/JP2018/042781, dated Jan. 8, 2019.

*Primary Examiner* — Shreyans A Patel

(57) ABSTRACT

An example embodiment includes a neural network unit to which a plurality of element values based on learning target data are input, and a learning unit that trains the neural network unit. The neural network unit has a plurality of learning cells each including a plurality of input nodes that perform predetermined weighting on each of the plurality of element values and an output node that sums the plurality of weighted element values and outputs the sum, and in accordance with an output value of each of the learning cells, the learning unit updates weighting coefficients of the plurality of input nodes of each of the learning cells or adds a new learning cell to the neural network unit.

20 Claims, 10 Drawing Sheets

(56) References Cited

U.S. PATENT DOCUMENTS

| | | | |
|---|---|---|---|
| 2019/0050713 A1* | 2/2019 | Narihira | G06N 3/08 |
| 2020/0285957 A1* | 9/2020 | Miyauchi | G06N 3/0454 |
| 2021/0125039 A1* | 4/2021 | Miyauchi | G06N 3/08 |

FOREIGN PATENT DOCUMENTS

| | | | |
|---|---|---|---|
| DE | 102017219365 A1 * | 5/2019 | B60K 28/02 |
| JP | H09-91263 A | 4/1997 | |
| JP | H09-259101 A | 10/1997 | |
| JP | 2001-051968 A | 2/2001 | |
| JP | 2002-251601 A | 9/2002 | |
| JP | 2003-317073 A | 11/2003 | |
| JP | 7005191 B2 * | 1/2022 | G06K 9/4642 |

\* cited by examiner

FIG. 9
(a)
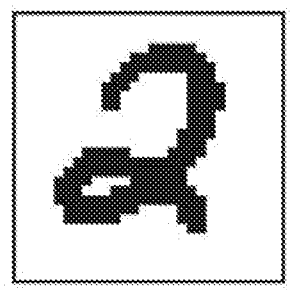
(b)
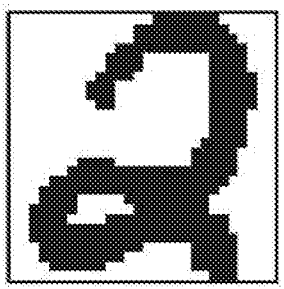
(c)
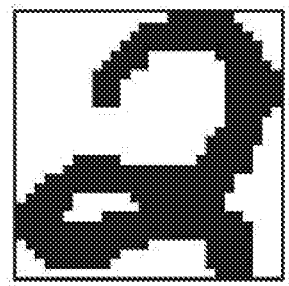
(d)
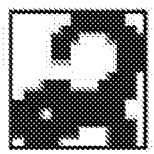
(e)
(f)

LEARNING DEVICE AND LEARNING METHOD, RECOGNITION DEVICE AND RECOGNITION METHOD, PROGRAM, AND STORAGE MEDIUM

This application is a National Stage Entry of PCT/JP2018/042781 filed on Nov. 20, 2018, which claims priority from Japanese Patent Application 2017-224329 filed on Nov. 22, 2017, the contents of all of which are incorporated herein by reference, in their entirety.

TECHNICAL FIELD

The present invention relates to a learning device and a learning method, a recognition device and a recognition method, a program, and a storage medium.

BACKGROUND ART

In recent years, deep learning using a multilayer neural network has attracted attention as a machine learning scheme. Deep learning is to use a calculation scheme called backpropagation to calculate an output error resulted when a large number of training data are input to a multilayer neural network and perform learning so that the error is the minimum.

Patent Literatures 1 to 3 disclose a neural network processing device that makes it possible to construct a neural network with less effort and operational processing load by defining a large scale neural network as a combination of a plurality of subnetworks. Further, Patent Literature 4 discloses a structure optimizing device that optimizes a neural network.

CITATION LIST

Patent Literature

PTL 1: Japanese Patent Application Laid-Open No. 2001-051968
PTL 2: Japanese Patent Application Laid-Open No. 2002-251601
PTL 3: Japanese Patent Application Laid-Open No. 2003-317073
PTL 4: Japanese Patent Application Laid-Open No. H09-091263

SUMMARY OF INVENTION

Technical Problem

In deep learning, however, a large amount of good quality data is required as training data, and it takes long time for learning. Although Patent Literatures 1 to 4 propose a scheme to reduce effort or operational processing load taken for construction of a neural network, there is a demand for a learning device having a neural network that enables learning with a simpler algorithm in order to further reduce a system load or the like.

An example object of the present invention is to provide a learning device and a learning method, a program, and a storage medium having a neural network that enables learning with a simpler algorithm. Further, another example object of the present invention is to provide a recognition device and a recognition method, a program, and a storage medium configured by using such a neural network to achieve a high recognition rate.

Solution to Problem

According to one example aspect of the present invention, provided is a learning device including a neural network unit to which a plurality of element values based on learning target data are input, and a learning unit that trains the neural network unit, wherein the neural network unit has a plurality of learning cells each including a plurality of input nodes that perform predetermined weighting on each of the plurality of element values and an output node that sums the plurality of weighted element values and outputs the sum, and wherein in accordance with an output value of each of the learning cells, the learning unit updates weighting coefficients of the plurality of input nodes of each of the learning cells or adds a new learning cell to the neural network unit.

Further, according to another example aspect of the present invention, provided is a recognition device including a neural network unit to which a plurality of element values based on recognition target data are input, and a recognition unit that recognizes the recognition target data based on output of the neural network unit, wherein the neural network unit has a plurality of learning cells each including a plurality of input nodes that perform predetermined weighting on each of the plurality of element values and an output node that sums the plurality of weighted element values and outputs the sum, wherein each of the plurality of learning cells is linked with any of a plurality of categories indicting training information, wherein the plurality of input nodes of each of the learning cells are configured such that each of the plurality of element values is input at a predetermined weight in accordance with a corresponding category, and wherein based on an output value of each of the learning cells and a category linked with each of the learning cells, the recognition unit recognizes a category to which the recognition target data belongs.

Further, according to yet another example aspect of the present invention, provided is a learning method of a learning device that includes a neural network unit having a plurality of learning cells each including a plurality of input nodes to which a plurality of element values based on learning target data are input and an output node that sums the plurality of element values at respective predetermined weights for the plurality of element values and outputs the sum, the learning method including inputting a plurality of element values based on learning target data to the plurality of input nodes of the learning cells, and in accordance with an output value of each of the learning cells, training the neural network unit by updating weighting coefficients of the plurality of input nodes of the learning cells or adding a new learning cell to the neural network unit.

Further, according to yet another example aspect of the present invention, provided is a recognition method using a recognition device that includes a neural network unit having a plurality of learning cells, wherein each of the learning cells includes a plurality of input nodes to which a plurality of element values based on recognition target data are input and an output node that sums the plurality of element values at predetermined weights for the plurality of element values and outputs the sum, and each of the learning cells is linked with any of a plurality of categories indicating training information, the recognition method including inputting a plurality of element values based on recognition target data to the plurality of input nodes of the plurality of learning cells, and based on an output value of each of the learning cells and a category linked with each of the learning cells, recognizing a category to which the recognition target data belongs.

Further, according to yet another example aspect of the present invention, provided is a program executed by a learning device that performs learning based on learning target data, the program causing a computer to function as a neural network unit having a plurality of learning cells each including a plurality of input nodes to which a plurality of element values based on learning target data are input and an output node that sums the plurality of weighted element values and outputs the sum, and a unit that, in accordance with an output value of each of the learning cells, updates weighting coefficients of the plurality of input nodes of each of the learning cells or adds a new learning cell to the neural network unit.

Further, according to yet another example aspect of the present invention, provided is a program executed by a recognition device that performs recognition based on recognition target data, the program causing a computer to function as a neural network unit having a plurality of learning cells, wherein each of the learning cells includes a plurality of input nodes to which a plurality of element values based on recognition target data are input and an output node that sums the plurality of weighted element values and outputs the sum, and each of the learning cells is linked with any of a plurality of categories indicting training information, and a unit that, based on an output value of each of the learning cells and a category linked with each of the learning cells, recognizes a category to which the recognition target data belongs.

Advantageous Effects of Invention

According to the present invention, it is possible to construct a neural network that enables learning with a simpler algorithm and achieves a high recognition rate.

BRIEF DESCRIPTION OF DRAWINGS

FIG. 9 is a diagram illustrating one example of a preprocess performed on learning target data and recognition target data.

DESCRIPTION OF EMBODIMENTS

First Example Embodiment

Figure 1:
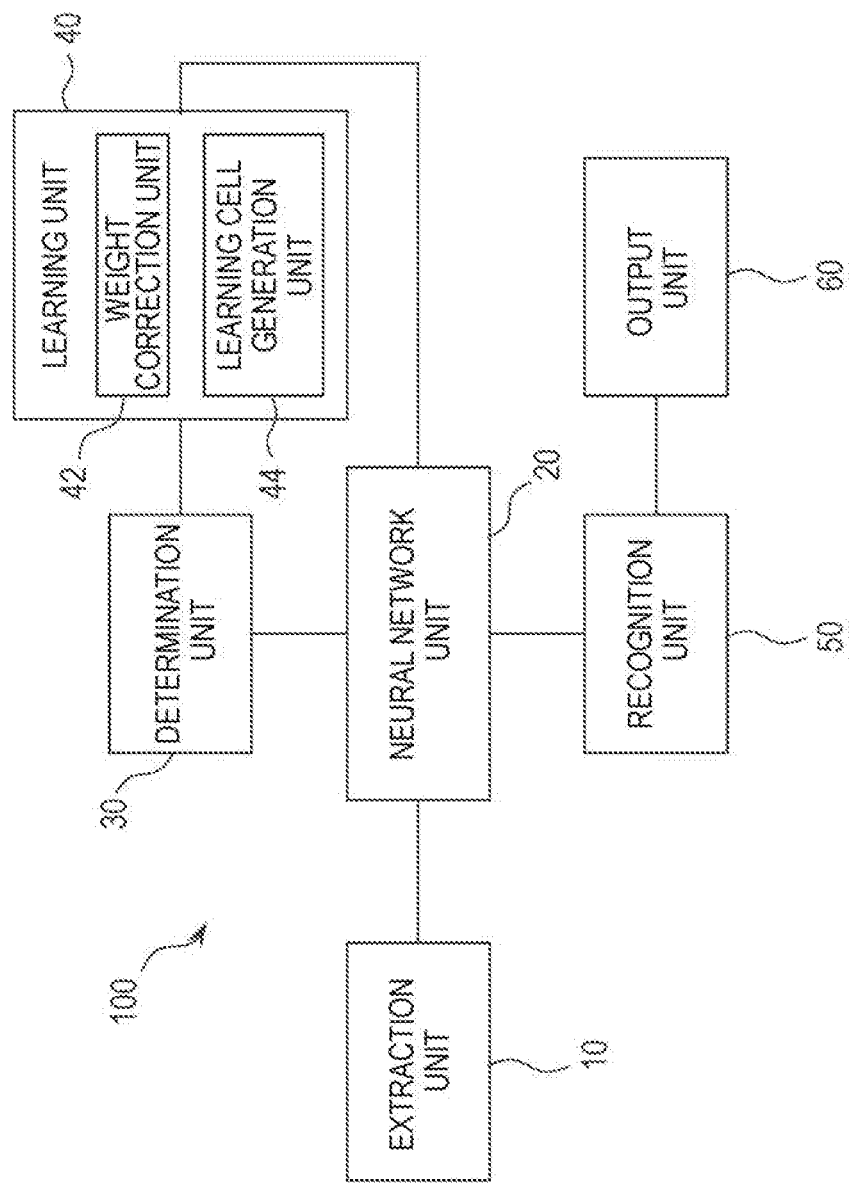
FIG. 1 is a schematic diagram illustrating a configuration example of a learning/recognition device according to a first example embodiment of the present invention.
Figure 2:
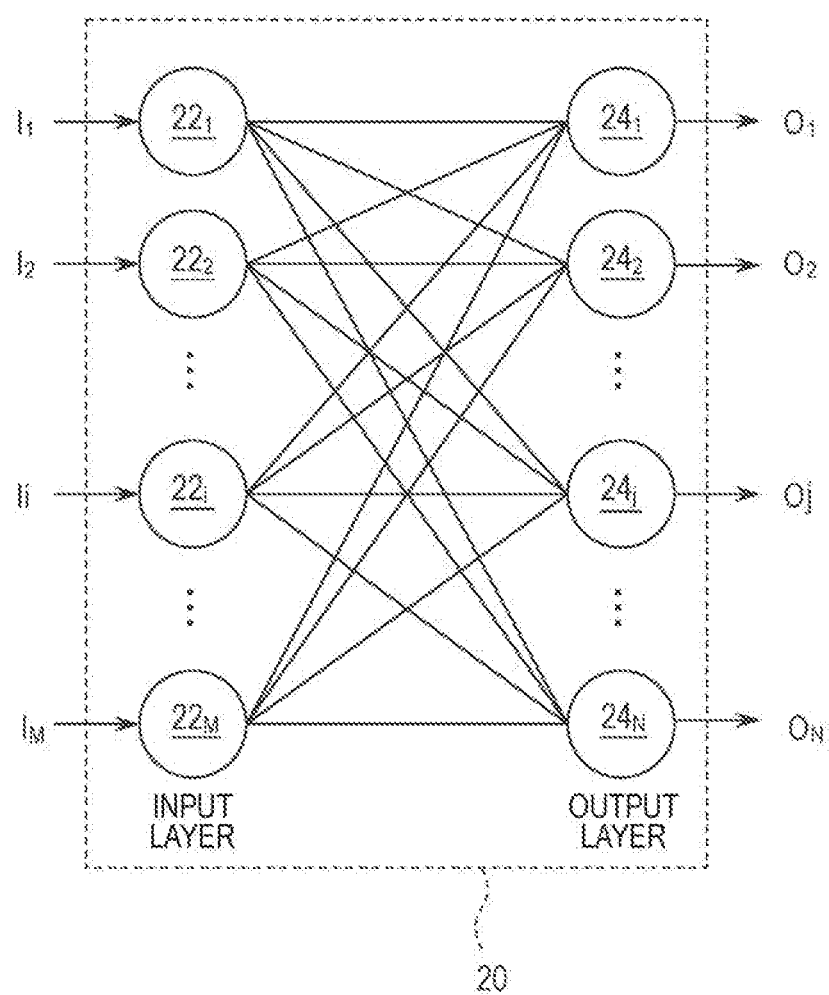
FIG. 2 is a schematic diagram illustrating a configuration example of a neural network unit in the learning/recognition device according to the first example embodiment of the present invention.
Figure 3:
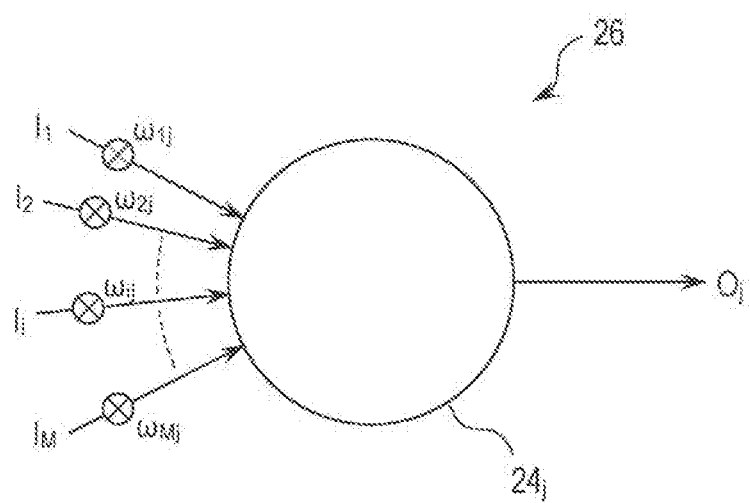
FIG. 3 is a schematic diagram illustrating a configuration example of a learning cell in the learning/recognition device according to the first example embodiment of the present invention.
Figure 4:
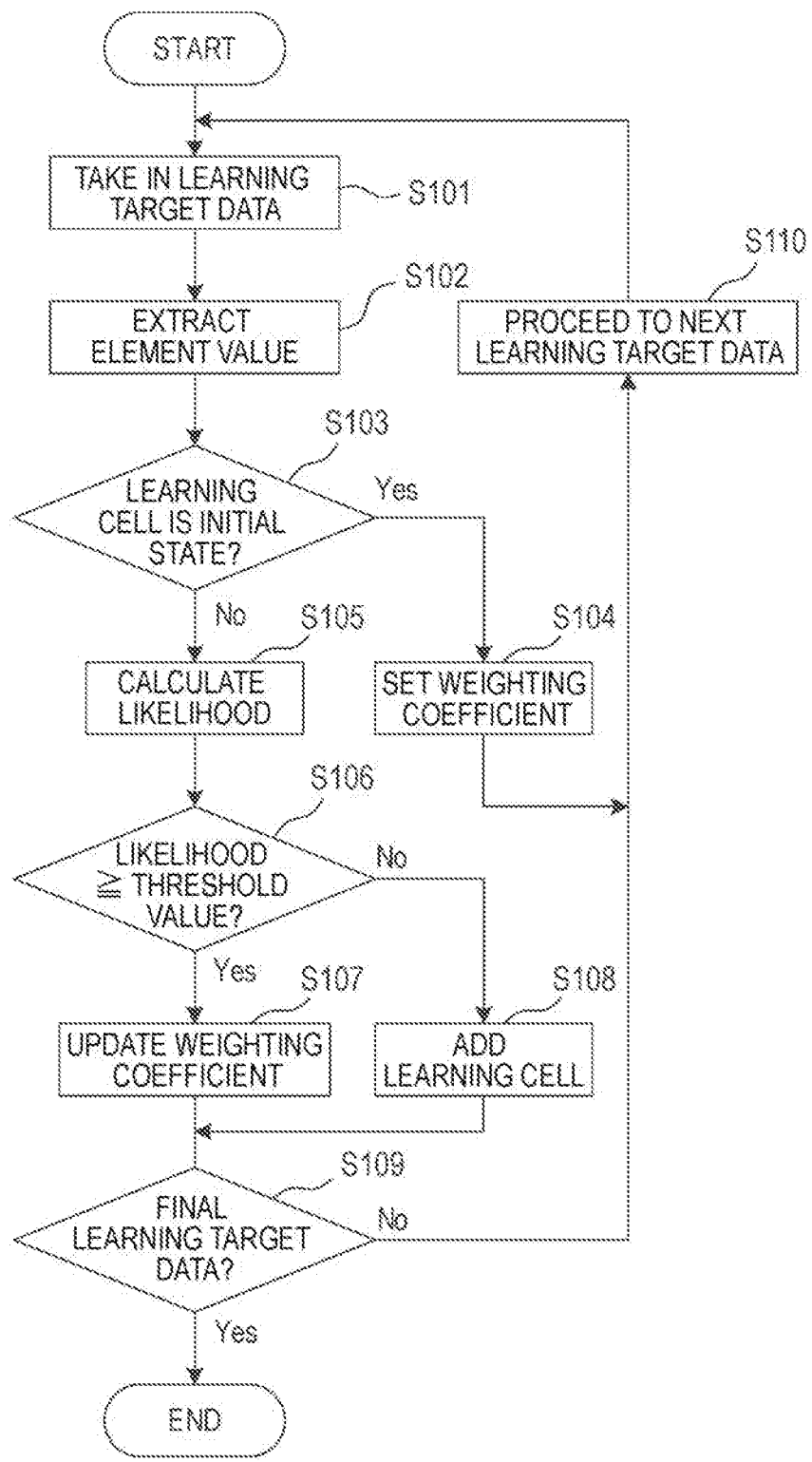
FIG. 4 is a flowchart illustrating a learning method in the learning/recognition device according to the first example embodiment of the present invention.
Figure 5:
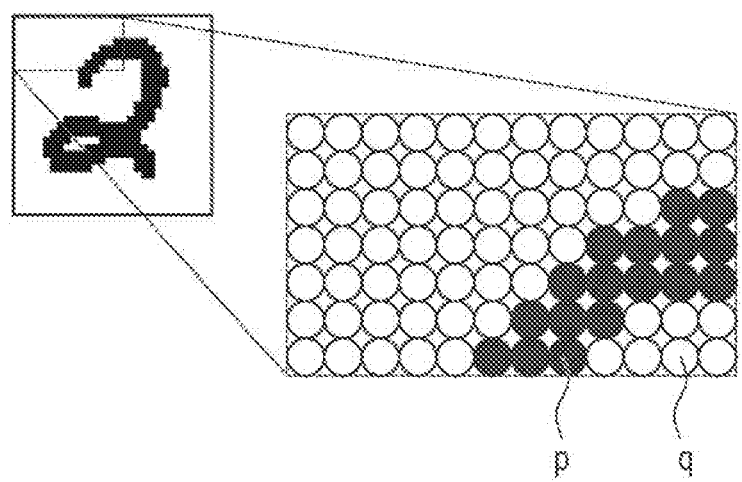
FIG. 5 is a diagram illustrating one example of learning target data and element values thereof.
Figure 6:
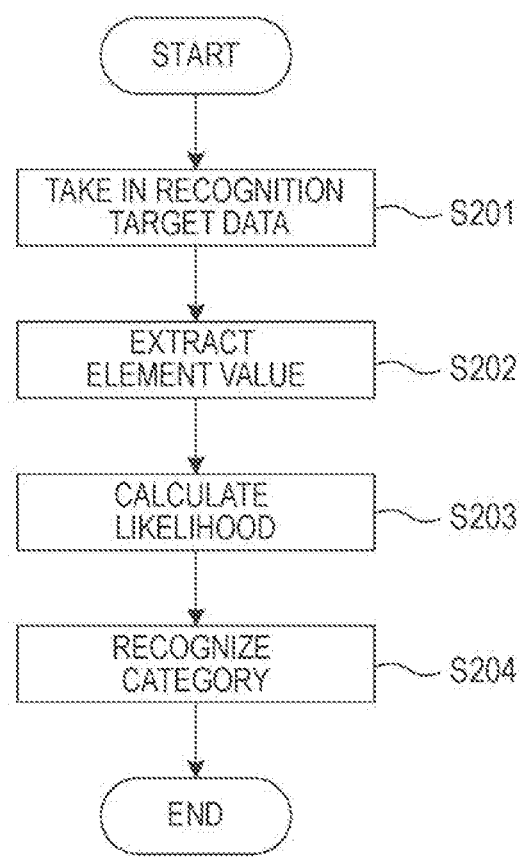
FIG. 6 is a flowchart illustrating a recognition method in the learning/recognition device according to the first example embodiment of the present invention.
Figure 7:
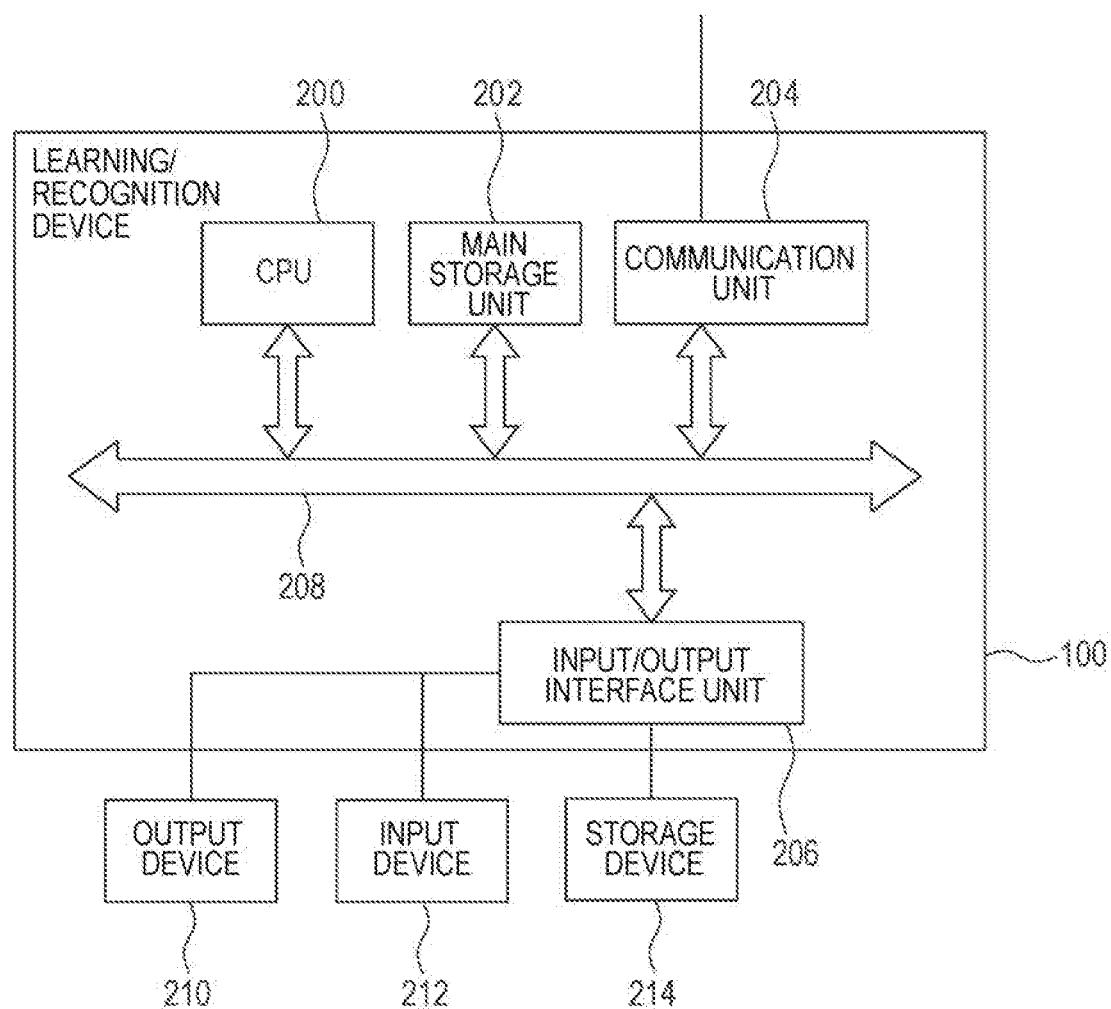
FIG. 7 is a schematic diagram illustrating an example of a hardware configuration of the learning/recognition device according to the first example embodiment of the present invention.

A learning/recognition device according to a first example embodiment of the present invention will be described with reference to FIG. 1 to FIG. 7. FIG. 1 is a schematic diagram illustrating a configuration example of a learning/recognition device according to the present example embodiment. FIG. 2 is a schematic diagram illustrating a configuration example of a neural network unit in the learning/recognition device according to the present example embodiment. FIG. 3 is a schematic diagram illustrating a configuration example of a learning cell in the learning/recognition device according to the present example embodiment. FIG. 4 is a flowchart illustrating a learning method in the learning/recognition device according to the present example embodiment. FIG. 5 is a diagram illustrating one example of learning target data and element values thereof. FIG. 6 is a flowchart illustrating a recognition method in the learning/recognition device according to the present example embodiment. FIG. 7 is a schematic diagram illustrating an example of a hardware configuration of the learning/recognition device according to the present example embodiment.

First, the general configuration of the learning/recognition device according to the present example embodiment will be described with reference to FIG. 1 to FIG. 3. As illustrated in FIG. 1, a learning/recognition device 100 according to the present example embodiment has an extraction unit 10, a neural network unit 20, a determination unit 30, a learning unit 40, a recognition unit 50, and an output unit 60. The learning unit 40 has a weight correction unit 42 and a learning cell generation unit 44.

The extraction unit 10 extracts, from externally input learning target data or recognition target data, a predetermined number of predetermined element values (pattern data) in accordance with a form of the data.

The neural network unit 20 may be formed of a two-layered artificial neural network including an input layer and an output layer as illustrated in FIG. 2, for example. The input layer has cells (neurons) 22, the number of which corresponds to the number of element values extracted from single learning target data or recognition target data. For example, when the number of element values generated from single learning target data or recognition target data is M, the input layer includes at least M cells $22_1$, $22_2$, ..., $22_i$, ..., $22_M$. The output layer includes cells (neurons) 24, for example, N cells $24_1$, $24_2$, ..., $24_j$, ..., $24_N$, the number of which corresponds to the number of categories of training information linked with at least learning target data.

M element values $I_1, I_2, \ldots, I_i, \ldots, I_M$ supplied from the extraction unit 10 are input to the cells $22_1$, $22_2$, ..., $22_i$, ..., $22_M$ of the input layer, respectively. Each of the cells $22_1$, $22_2$, ..., $22_i$, ..., $22_M$ outputs an input element value I to each of the cells $24_1$, $24_2$, ..., $24_i$, ..., $24^M$.

A weighting coefficient w used for predetermined weighting on an element value I is set to each of branches (axon)

connecting the cell 22 and the cell 24. For example, as illustrated in FIG. 3, weighting coefficients $\omega_{1j}$, $\omega_{2j}$, ..., $\omega_{ij}$, ..., $\omega_{Mj}$ are set to branches connecting cells $22_1$, $22_2$, ..., $22_i$, ..., $22_M$ to the cell $24_j$. Thereby, the cell $24_j$ performs an operation indicated in Equation (1) below and outputs an output value $O_j$.

[Math. 1]

$$O_j = \sum_{i=1}^{N} \omega_{ij} \times I_i \qquad (1)$$

Note that, in the present specification, one cell 24, branches that input element values $I_1$ to $I_M$ to the cell 24 (input node), and a branch that outputs an output value O from the cell 24 (output node) may be collectively denoted as a learning cell 26.

The determination unit 30 compares, with a predetermined threshold value, a correlation value between a plurality of element values extracted from learning target data and an output value of a learning cell and determines whether the correlation value is greater than or equal to the threshold value or less than the threshold value. One example of the correlation value is a likelihood for an output value of a learning cell. Note that the function of the determination unit 30 may be considered as being provided to each of the learning cells 26.

The learning unit 40 is a function block that trains the neural network unit 20 in accordance with a determination result of the determination unit 30. The weight correction unit 42 updates the weighting coefficient w set for the input node of the learning cell 26 when the correlation value described above is greater than or equal to the predetermined threshold value. Further, the learning cell generation unit 44 adds a new learning cell 26 to the neural network unit 20 when the correlation value described above is less than the predetermined threshold value.

The recognition unit 50 recognizes the category of the recognition target data based on the correlation value between a plurality of element values extracted from learning target data and the output value of a learning cell. The output unit 60 outputs a result recognized by the recognition unit 50.

Note that the learning/recognition device 100 according to the present example embodiment can be formed of a learning device having a learning function and a recognition device having a recognizing function. In such a case, the learning device may have at least the extraction unit 10, the neural network unit 20, the determination unit 30, and the learning unit 40. Further, the recognition device may have at least the extraction unit 10, the neural network unit 20, and the recognition unit 50. Note that the learning/recognition device 100, the learning device, and the recognition device are not necessarily required to have the extraction unit 10 and may be configured such that element values extracted from learning target data or recognition target data by another device or the like are directly input to the neural network unit 20.

Next, a learning method using the learning/recognition device 100 according to the present example embodiment will be described with reference to FIG. 4 and FIG. 5. Note that, although description will be provided here assuming a case where learning target data is a monochrome two-dimensional image including 10 types of handwritten characters of 0 to 9 for easier understanding, the type of learning target data is not particularly limited. The learning target data may be, for example, image data, voice data, or the like.

First, the learning cells 26, the number of which corresponds to the number of categories of training information linked with learning target data, are set for the neural network unit 20 as an initial state. For example, when the neural network unit 20 is caused to learn handwritten characters of 0 to 9, the number of categories of training information is 10, namely, 0 to 9, and 10 learning cells 26 corresponding to the number of categories are set. Each of the learning cells 26 is linked with the category of training information.

Next, learning target data is taken in the extraction unit 10 (step S101). Here, as one example of learning target data, a monochrome two-dimensional image including a handwritten character "2" as illustrated in the left side in FIG. 5 is assumed.

Next, at the extraction unit 10, an element value indicating a feature of the learning target data is extracted from the taken learning target data (step S102). An element value can be selected as appropriate in accordance with the type or the like of the taken learning target data. For example, with respect to the learning target data illustrated in FIG. 5, the taken image is divided on a pixel basis, and each pixel can be associated with each element value, as illustrated in the enlarged view on the right side. Further, the element value corresponding to a white pixel can be defined as 0, and the element value corresponding to a black pixel can be defined as 1. For example, in the example of FIG. 5, the element value $I_p$ corresponding to the p-th pixel is 1, and the element value $I_q$ corresponding to the q-th pixel is 0. The element values corresponding to single learning target data are element values $I_1$ to $I_M$.

Next, the element values $I_1$ to $I_M$ extracted by the extraction unit 10 are input to the neural network unit 20. The element values $I_1$ to T input to the neural network unit 20 are input to the learning cell 26 linked with the category of training information on the taken learning target data via the cells $22_1$ to $22_M$. For example, the element values $I_1$ to $I_M$ extracted from the learning target data illustrated in FIG. 5 are input to the learning cell 26 linked with the category "2".

Next, it is determined whether or not the learning cell 26 to which the element values $I_1$ to $I_M$ are input is in a state where the weighting coefficient w is not set for each input node, that is, the initial state where no learning has been performed (step S103).

If the learning cell 26 is in the initial state (step S103, "Yes"), the values of the element values $I_1$ to $I_M$ input to the neural network unit 20 are set as initial values of weighting coefficients w for the input nodes of the learning cell 26 of interest (step S104). For example, as illustrated in FIG. 5, when learning target data linked with the category "2" is taken in, weighting coefficients w corresponding to the element values $I_1$ to $I_M$ are set for each of the input nodes of the learning cell 26 linked with the category "2". For example, in the example of FIG. 5, the weighting coefficient $\omega_{pj}$ of the input node corresponding to the p-th pixel of the learning cell $26_j$ is 1, and the weighting coefficient $\omega_{qj}$ of the input node corresponding to the q-th pixel of the learning cell $26_j$ is 0.

On the other hand, if the learning cell 26 is not the initial state (step S103, "No"), the element values $I_1$ to $I_M$ are input to the learning cell 26 of interest, and the output value O is obtained. In this case, since the weighting coefficients w are already set for the input nodes of the learning cell 26 of interest, the output value O is calculated based on Equation (1).

Next, the correlation value between the element values $I_1$ to $I_M$ and the output value O of the learning cell 26 (here, likelihood P regarding the output value of the learning cell) is calculated in the determination unit 30 based on the output value O of the learning cell 26 of interest (step S105). The calculation method of the likelihood P is not particularly limited. For example, the likelihood $P_j$ of the learning cell $26_j$ can be calculated based on Equation (2) below.

[Math. 2]

$$P_j = \frac{\sum (I_i \times \omega_{ij})}{\sum \omega_{ij}} \quad (2)$$

Equation (2) indicates that the likelihood $P_j$ is represented by a ratio of the output value $O_j$ of the leaning cell $26_j$ to the cumulative value of the weighting coefficients $\omega_{ij}$ of the plurality of input nodes of the leaning cell $26_j$. Alternatively, Equation (2) indicates that the likelihood $P_j$ is represented by a ratio of the output value of the leaning cell $26_j$, which is obtained when a plurality of element values are input, to the maximum value of the output of the learning cell $26_j$ based on the weighting coefficients $\omega_{ij}$ of the plurality of input nodes.

Next, at the determination unit 30, the value of the calculated likelihood P is compared with a predetermined threshold value to determine whether or not the value of the likelihood P is greater than or equal to the threshold value (step S106).

If one or more learning cells 26 whose value of the likelihood P is greater than or equal to the threshold value is present out of the learning cells 26 linked with the category of training information on the taken learning target data (step S106, "Yes"), the process proceeds to step S107. In step S107, the weighting coefficient w of the input node of the leaning cell 26 whose value of the likelihood P is the largest of the learning cells 26 linked with the category of interest is updated. The weighting coefficient $\omega_{ij}$ of the input node of the learning cell $26_j$ can be corrected based on Equation (3) below, for example.

$\omega_{ij}$=(the number of occurrences of black in the $i$-th pixel)/(the number of times of learning) (3)

Equation (3) indicates that the weighting coefficient w of each of the plurality of input nodes of the learning cell 26 is determined by the cumulative mean value of the element value I input from the corresponding input node. In such a way, information on learning target data whose value of the likelihood P is greater than or equal to the predetermined threshold value is accumulated to the weighting coefficient w of each input node, and thereby the value of weighting coefficient w is larger for an input node corresponding to a pixel having a greater number of occurrences of black (1). Such a learning algorithm of the learning cell 26 is approximated to the Hebb's rule known as a learning principle of a human brain.

On the other hand, if no learning cell 26 whose value of the likelihood P is greater than or equal to the threshold value is present out of the learning cells 26 linked with the category of training information of the taken learning target data (step S106, "NO"), the process proceeds to step S108. In step S108, a new learning cell 26 linked with the category of interest is generated. Each value of element values $I_1$ to $I_M$ is set to respective input nodes of the newly generated learning cell 26 as an initial value of the weighting coefficient w in the same manner as the case where the learning cell 26 is in the initial state.

For example, when learning target data is a handwritten character, it is expected that the value of likelihood is less than the threshold value even though the category of training information is the same when the inclination of the character differs or the like. By adding the learning cell 26 linked with the same category, it is possible to learn various forms of learning target data belonging to the same category and thus increase the recognition rate.

With respect to the threshold value used for determination of the likelihood P, a larger value thereof increases the recognition rate but increases the number of learning cells 26, which requires much time for leaning. Contrarily, a smaller value of the threshold value reduces recognition rate but reduces the number of learning cells 26, which reduces the time required for learning. It is desirable to set the setting value of the threshold value suitably so as to obtain a desired recognition rate or learning time in accordance with the type, the form, or the like of the learning target data and the recognition target data.

In such a way, it is possible to learn the neural network unit 20 based on the taken learning target data.

Next, the process from step S101 to step S108 described above is performed on all the learning target data (steps S109, S110) to relatedly train the neural network unit 20.

In the learning method using the learning/recognition device 100 according to the present example embodiment, backpropagation used in deep learning or the like is not applied, and learning with a single path is possible. Thus, the learning process in the neural network unit 20 can be simplified. Further, since each of the learning cells 26 is independent, it is easy to add, delete, or update learning data.

Next, a recognition method of recognition target data using the learning/recognition device 100 according to the present example embodiment will be described by using FIG. 6.

First, recognition target data is taken in the extraction unit 10 (step S201).

Next, at the extraction unit 10, element values $I_1$ to $I_M$ indicating the feature of recognition target data are extracted from the taken recognition target data (step S202). The element value I can be selected suitably in accordance with the type or the like of the taken recognition target data in the same manner as in the case of the learning target data.

Next, the element values $I_1$ to $I_M$ extracted by the extraction unit 10 are input to the neural network unit 20 trained as described above. The element values $I_1$ to $I_M$ input to the neural network unit 20 are input to respective learning cells 26 via the cells $22_1$ to $22_M$. Thereby, output values O in accordance with the element values $I_1$ to $I_M$ are obtained from all the learning cells 26.

Next, at the recognition unit 50, a correlation value between the element values $I_1$ to $I_M$ and the output values O of the learning cells 26 is calculated based on the output values O output from the learning cells 26 (here, the correlation value is the likelihood P regarding the output value of the learning cell) (step S203). The calculation method of the likelihood P is not particularly limited. For example, the likelihood $P_j$ of the learning cell $26_j$ can be calculated based on Equation (2) described above. Note that it can also be considered that each of the learning cells 26 has the function of calculating the likelihood P.

Next, the category to which the recognition target data belongs is recognized based on the calculated likelihood P of all the learning cells 26 (step S204). The method of recognizing the category to which the recognition target data belongs is not particularly limited. For example, the category linked with the learning cell 26 having the largest likelihood P out of all the learning cells 26 can be recognized as a category to which the recognition target data belongs. Alternatively, a predetermined number of learning cells 26 can be extracted out of all the learning cells 26 in descending order of the likelihood P, and a category with which the largest number of the extracted learning cells 26 are linked can be recognized as the category to which the recognition target data belongs.

Note that the neural network unit 20 may be trained by using the element values $I_1$ to $I_M$ extracted from recognition target data after a category to which the recognition target data belongs is recognized. For example, out of the learning cells 26 liked to the recognized category, the weighting coefficient w of an input node of the learning cell 26 having the largest likelihood can be updated by using the element values $I_1$ to $I_M$ extracted from the recognition target data of interest. That is, the learning/recognition device 100 according to the present example embodiment can perform so-called dynamic learning and can easily perform an additional learning process using recognition target data.

Next, a hardware configuration example of the learning/recognition device 100 according to the present example embodiment will be described with reference to FIG. 7. FIG. 7 is a schematic diagram illustrating an example of the hardware configuration of the learning/recognition device according to the present example embodiment.

As illustrated in FIG. 7, the learning/recognition device 100 can be realized by a hardware configuration similar to that of a general information processing device. For example, the learning/recognition device 100 has a central processing unit (CPU) 200, a main storage unit 202, a communication unit 204, and an input/output interface unit 206.

The CPU 200 is a control/operation device that is responsible for overall control or operational processing of the learning/recognition device 100. The main storage unit 202 is a storage unit used for a working area of data or a temporary save area of data and is formed of a memory device such as a random access memory (RAM). The communication unit 204 is an interface used for transmitting and receiving data via a network. The input/output interface unit 206 is an interface connected to an external output device 210, an input device 212, a storage device 214, or the like for transmitting and receiving data. The CPU 200, the main storage unit 202, the communication unit 204, and the input/output interface unit 206 are connected to each other by a system bus 208. The storage device 214 may be formed of a hard disk device or the like formed of a nonvolatile memory such as a read only memory (ROM), a magnetic disk, a semiconductor memory, or the like, for example.

The main storage unit 202 can be used as a working area used for constructing the neural network unit 20 including the plurality of learning cells 26 and performing an operation. The CPU functions as a control unit that controls operational processing in the neural network unit 20 constructed in the main storage unit 202. In the storage device 214, learning cell information including information regarding trained learning cells 26 can be stored. Further, when learning cell information stored in the storage device 214 is read and a neural network unit is constructed in the main storage unit 202, such a configuration can be utilized for recognizing various recognition target data. It is desirable that the CPU 200 be configured to execute operational processing in parallel for a plurality of learning cells in the neural network unit constructed in the main storage unit 202.

The communication unit 204 is a communication interface based on a standard such as Ethernet (registered trademark), Wi-Fi (registered trademark), or the like and is a module for communicating with other devices. The learning cell information may be received from another device via the communication unit 204. For example, learning cell information which is frequently used is stored in the storage device 214 in advance, and learning cell information which is less frequently used may be loaded from another device.

The input device 212 is a keyboard, a mouse, a touch-screen, or the like and is used for inputting predetermined information to the learning/recognition device 100 by the user. Further, the input device 212 can also be used as a unit for inputting learning target data or recognition target data. For example, when learning target data or recognition target data is a two-dimensional image, an image reading device can be applied as the input device 212.

Learning target data or recognition target data can also be configured to be loaded from the storage device 214 or another device via the communication unit 204. The output device 210 includes a display such as a liquid crystal display device, for example. Notification of a learning result or a recognition result may be performed via the output device 210.

The function of each unit of the learning/recognition device 100 according to the present example embodiment can be realized in a hardware like manner by implementing a circuit component that is a hardware component such as Large Scale Integration (LSI) in which a program is embedded. Alternatively, the function can be realized also in a software like manner by storing a program that provides the function in the storage device 214, loading the program to the main storage unit 202, and executing the program by the CPU 200.

As described above, according to the present example embodiment, a learning/recognition device having a neural network that enables learning with a simpler algorithm and achieves a high recognition rate can be realized.

Second Example Embodiment

Figure 8:
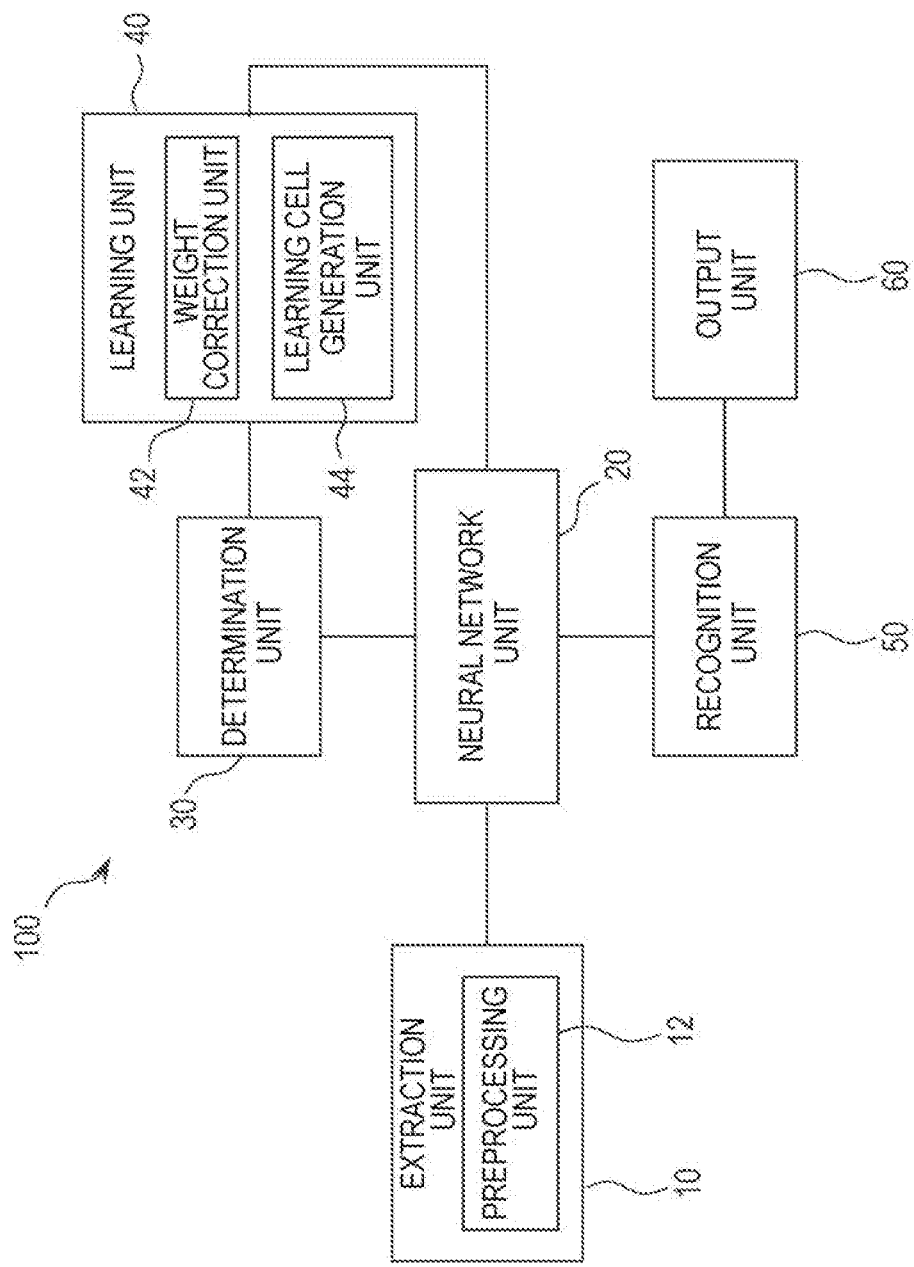
FIG. 8 is a schematic diagram illustrating a configuration example of a learning/recognition device according to a second example embodiment of the present invention.

A learning/recognition device according to a second example embodiment of the present invention will be described with reference to FIG. 8 and FIG. 9. The same components as those of the learning/recognition device according to the first example embodiment will be labeled with the same references, and the description thereof will be omitted or simplified. FIG. 8 is a schematic diagram illustrating a configuration example of the learning/recognition device according to the present example embodiment. FIG. 9 is a diagram illustrating one example of a preprocess performed on learning target data and recognition target data.

As illustrated in FIG. 8, the learning/recognition device according to the present example embodiment is the same as the learning/recognition device 100 according to the first example embodiment except that the extraction unit 10 further has a preprocessing unit 12. The preprocessing unit 12 is a function block that performs a preprocess on the learning target data and the recognition target data input to the extraction unit 10.

The preprocess performed on learning target data and recognition target data is a process for improving a recognition rate for the learning target data and the recognition target data, and the detail thereof is not particularly limited.

Such a preprocess may be, for example, a normalization process, a pooling process, a feature extraction process, or the like.

FIG. 9 is a schematic diagram illustrating an example of a normalization process and a pooling process when learning target data or recognition target data is a monochrome two-dimensional image including a handwritten character. FIG. 9(a) illustrates one example of learning target data or recognition target data before a preprocess is performed. FIG. 9(b) and FIG. 9(c) are examples in which a normalization process is performed on the data of FIG. 9(a). The normalization process as used herein is a process of expanding a character portion of data to the whole data area. FIG. 9(b) is an example in which a character portion is enlarged vertically and horizontally at the same ratio while the aspect of the character is maintained. FIG. 9(c) is an example in which the aspect of the character is ignored and a character portion is enlarged vertically and horizontally at different ratios, respectively. FIG. 9(d), FIG. 9(e), and FIG. 9(f) are examples in which a pooling process is performed on the data of FIG. 9(c). The pooling process as used herein is a process of sampling a block made of a plurality of pixels as one pixel. FIG. 9(d) is an example in which a block of 2×2 pixels is converted into one pixel. FIG. 9(e) is an example in which a block of 4×4 pixels is converted into one pixel. FIG. 9(f) is an example in which a block of 7×7 pixels is converted into one pixel.

In the study result in a system used by the inventors, the recognition rate when a preprocess is not performed on 60000 data (corresponding to FIG. 9(a)) is 89.4%, and the learning time is 383 seconds. On the other hand, the recognition rate when normalization is performed with the aspect of the character being maintained (corresponding to FIG. 9(b)) is 95.1%, and the learning time is 495 seconds. Further, the recognition rate when normalization is performed with the aspect of the character being ignored (corresponding to FIG. 9(c)) is 97.1%, and the learning time is 566 seconds. As discussed above, when a normalization process of data is performed, while the learning time tends to increase, the recognition rate can be significantly improved.

On the other hand, the recognition rate when a pooling process is performed with a block of 2×2 pixels (corresponding to FIG. 9(d)) is 96.5%, and the learning time is 135 seconds. The recognition rate when a pooling process is performed with a block of 4×4 pixels (corresponding to FIG. 9(e)) is 85.4%, and the learning time is 21 seconds. Further, the recognition rate when a pooling process is performed with a block of 7×7 pixels (corresponding to FIG. 9(f)) is 30.5%, and the learning time is 2 seconds. In the pooling process, while the recognition rate significantly deteriorates in accordance with the degree thereof, both improvement of the recognition rate and reduction of the learning time can be realized by selecting a suitable degree.

The process performed in the preprocessing unit 12 may not be a process of performing a process directly on learning target data and recognition target data as with the normalization process or a pooling process. For example, a feature extraction unit of a trained deep learning model may be used as the preprocessing unit 12. That is, a feature amount extracted from a trained deep learning model may be used as an element value input to the neural network unit 20.

The process performed in the preprocessing unit 12 is not necessarily required to be a single type, and two or more processes may be combined.

As described above, according to the present example embodiment, a learning/recognition device having a neural network that enables learning with a simpler algorithm and achieves a high recognition rate can be realized.

Third Example Embodiment

A learning device according to a third example embodiment of the present invention will be described with reference to FIG. 10.

The same components as those of the learning/recognition device according to the first and second example embodiments will be labeled with the same references, and the description thereof will be omitted or simplified. FIG. 10 is a schematic diagram illustrating a configuration example of the learning device according to the present example embodiment.

Figure 10:
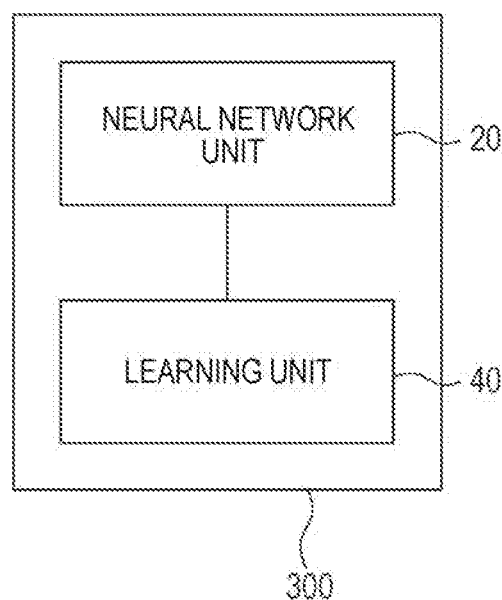
FIG. 10 is a schematic diagram illustrating a configuration example of a learning device according to a third example embodiment of the present invention.

As illustrated in FIG. 10, the learning device 300 according to the present example embodiment has the neural network unit 20 and the learning unit 40.

A plurality of element values based on learning target data are input to the neural network unit 20. The neural network unit 20 has a plurality of learning cells each including a plurality of input nodes at which predetermined weighting is performed on each of the plurality of element values and an output node that sums the plurality of weighted element values and outputs the sum.

The learning unit updates the weighting coefficient w of the plurality of input nodes of the learning cell 26 or adds a new learning cell 26 to the neural network unit 20 in accordance with the output value of the learning cell 26.

With such a configuration, a learning device having a neural network that enables learning with a simpler algorithm and achieves a high recognition rate can be realized.

Fourth Example Embodiment

Figure 11:
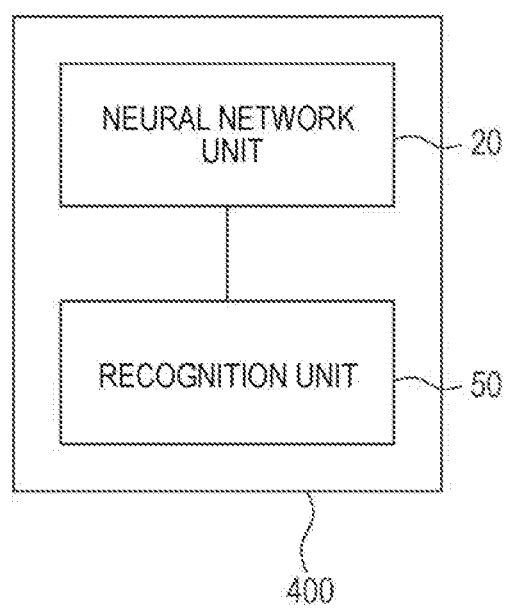
FIG. 11 is a schematic diagram illustrating a configuration example of a recognition device according to a fourth example embodiment of the present invention.

A recognition device according to a fourth example embodiment of the present invention will be described with reference to FIG. 11. The same components as those of the learning/recognition device according to the first and second example embodiments will be labeled with the same references, and the description thereof will be omitted or simplified. FIG. 11 is a schematic diagram illustrating a configuration example of the recognition device according to the present example embodiment.

As illustrated in FIG. 11, a recognition device 400 according to the present example embodiment has the neural network unit 20 and the recognition unit 50.

A plurality of element values based on recognition target data are input to the neural network unit 20. The neural network unit 20 has a plurality of learning cells 26 each including a plurality of input nodes at which predetermined weighting is performed on each of the plurality of element values and an output node that sums the plurality of weighted element values and outputs the sum. Each of the plurality of learning cells 26 is linked with any of a plurality of categories indicating training information. The plurality of input nodes of the learning cells 26 are configured such that each of the plurality of element values is input at a predetermined weight in accordance with a corresponding category.

The recognition unit 50 recognizes recognition target data based on the output of the neural network unit 20. The recognition unit 50 recognizes a category to which the recognition target data belongs based on the output values of the learning cell 26 and the category linked with the learning cell.

With such a configuration, a recognition device having a neural network that enables learning with a simpler algorithm and achieves a high recognition rate can be realized.

Modified Example Embodiments

The present invention is not limited to the example embodiments described above, and various modifications are possible.

For example, an example in which a part of the configuration of any of the example embodiments is added to another example embodiment or an example in which a part of the configuration of any of the example embodiments is replaced with a part of the configuration of another example embodiment is also one of the example embodiments of the present invention.

Further, in the example embodiments described above, a monochrome two-dimensional image including a black handwritten character has been illustrated as learning target data and recognition target data as an example. In the configuration described above, however, image data in which a white character is written in a black background may not be appropriately recognized, for example. In such a case, multiple types of learning cells 26 may be provided for a single type of category. For example, in the example described above, a learning cell 26 trained by definition that an element value corresponding to a white pixel is 0 and an element value corresponding to a black pixel is 1 and a learning cell 26 trained by definition that an element value corresponding to a white pixel is 1 and an element value corresponding to a black pixel is 0 can be set. With such a configuration, the recognition rate can be further increased.

Further, in the example embodiments described above, although the example in which an element value extracted from learning target data is input to only the learning cell 26 which is linked with a category of training information on the learning target data of interest has been illustrated, the extracted element values may be input to all the learning cells 26. In such a case, when the initial value is set to the weighting coefficient w of the learning cell 26 and when the weighting coefficient w of the input node is updated, the learning cell 26 linked with a category of training information on the taken learning target data may be a requirement, for example.

Further, in the example embodiments described above, although the neural network unit 20 is trained by using learning target data including training information, the learning target data is not necessarily required to include training information.

For example, a plurality of element values extracted from learning target data are input to all the learning cells 26, the learning cell 26 having the largest likelihood P is trained, and the input learning target data and the learning cell 26 having the largest likelihood P are associated with each other. Accordingly, it is possible to train the neural network unit 20 based on the feature of the learning target data and categorize the learning target data. After the learning training data is categorized in such a way, the learning cell 26 may be attached with a label in accordance with the categorized learning target data.

Further, the scope of each of the example embodiments includes a processing method that stores, in a storage medium, a program that causes the configuration of each of the example embodiments to operate so as to implement the function of each of the example embodiments described above, reads the program stored in the storage medium as a code, and executes the program in a computer. That is, the scope of each of the example embodiments also includes a computer readable storage medium. Further, each of the example embodiments includes not only the storage medium in which the program described above is stored but also the program itself.

As the storage medium, for example, a floppy (registered trademark) disk, a hard disk, an optical disk, a magneto-optical disk, a CD-ROM, a magnetic tape, a nonvolatile memory card, or a ROM can be used. Further, the scope of each of the example embodiments includes an example that operates on OS to perform a process in cooperation with another software or a function of an add-in board without being limited to an example that performs a process by an individual program stored in the storage medium.

Note that each of the example embodiments described above is a mere embodied example in implementing the present invention, and the technical scope of the present invention should not be construed in a limiting sense by these example embodiments. That is, the present invention can be implemented in various forms without departing from the technical concept or the primary feature thereof.

The whole or part of the example embodiments disclosed above can be described as, but not limited to, the following supplementary notes.

(Supplementary Note 1)

A learning device comprising:

a neural network unit to which a plurality of element values based on learning target data are input; and a learning unit that trains the neural network unit, wherein the neural network unit has a plurality of learning cells each including a plurality of input nodes that perform predetermined weighting on each of the plurality of element values and an output node that sums the plurality of weighted element values and outputs the sum, and wherein in accordance with an output value of each of the learning cells, the learning unit updates weighting coefficients of the plurality of input nodes of each of the learning cells or adds a new learning cell to the neural network unit.

(Supplementary Note 2)

The learning device according to supplementary note 1, wherein the learning unit adds the new learning cell when a correlation value between the plurality of element values and the output value of each of the learning cells is less than a predetermined threshold value.

(Supplementary Note 3)

The learning device according to supplementary note 2, wherein the learning unit sets each of the plurality of element values as an initial value of a weighting coefficient of each of a plurality of input nodes of the new learning cell.

(Supplementary Note 4)

The learning device according to supplementary note 1, wherein the learning unit updates the weighting coefficient of the plurality of input nodes of the learning cell when a correlation value between the plurality of element values and an output value of each of the learning cells is greater than or equal to a predetermined threshold value.

(Supplementary Note 5)

The learning device according to supplementary note 4, wherein when a plurality of the learning cells each having the correlation value that is greater than or equal to the threshold value are present, the learning unit updates the weighting coefficient of the plurality of input nodes of a learning cell having the largest correlation value.

(Supplementary Note 6)

The learning device according to supplementary note 4 or 5, wherein each of the plurality of learning cells is linked with any of a plurality of categories indicating training information, and wherein the learning unit updates the weighting coefficient of the learning cell linked with a category to which the input learning target data belongs.

(Supplementary Note 7)

The learning device according to any one of supplementary notes 4 to 6, wherein the learning unit updates the weighting coefficient of each of the plurality of input nodes of the learning cell based on each of the element values input from a corresponding one of the input nodes.

(Supplementary Note 8)

The learning device according to any one of supplementary notes 2 to 7, wherein the correlation value is a likelihood regarding the output value of each of the learning cells.

(Supplementary Note 9)

The learning device according to supplementary note 8, wherein the likelihood is a ratio of the output value of each of the learning cells, which is obtained when the plurality of element values are input, to the maximum value of output of each of the learning cells in accordance with a weighting coefficient set for each of the plurality of input nodes.

(Supplementary Note 10)

The learning device according to any one of supplementary notes 1 to 9 further comprising an extraction unit that extracts the plurality of element values from the learning target data obtained after a predetermined preprocess is performed.

(Supplementary Note 11)

The learning device according to supplementary note 10, wherein the preprocess is a normalization process, a pooling process, or a feature extraction process.

(Supplementary Note 12)

The learning device according to any one of supplementary notes 1 to 11 further comprising a storage unit that is a working area used for constructing the neural network unit including the plurality of learning cells and performing an operation and a control unit that controls an operational process in the neural network unit, wherein the control unit performs, in parallel, operational processes in the plurality of leaning cells for the plurality of element values in the neural network unit constructed in the storage unit.

(Supplementary Note 13)

A recognition device comprising:

a neural network unit to which a plurality of element values based on recognition target data are input; and a recognition unit that recognizes the recognition target data based on output of the neural network unit, wherein the neural network unit has a plurality of learning cells each including a plurality of input nodes that perform predetermined weighting on each of the plurality of element values and an output node that sums the plurality of weighted element values and outputs the sum, wherein each of the plurality of learning cells is linked with any of a plurality of categories indicting training information, wherein the plurality of input nodes of each of the learning cells are configured such that each of the plurality of element values is input at a predetermined weight in accordance with a corresponding category, and wherein based on an output value of each of the learning cells and a category linked with each of the learning cells, the recognition unit recognizes a category to which the recognition target data belongs.

(Supplementary Note 14)

The recognition device according to supplementary note 13, wherein the recognition unit recognizes, as a category to which the recognition target data belongs, a category linked with a learning cell having the largest correlation value between the plurality of element values and an output value of each of the learning cells.

(Supplementary Note 15)

The recognition device according to supplementary note 13, wherein the recognition unit extracts, out of the plurality of learning cells, a predetermined number of the learning cells in descending order of a correlation value between the plurality of element values and an output value of each of the learning cells and recognizes a category linked with the largest number of the extracted learning cells as a category to which the recognition target data belongs.

(Supplementary Note 16)

The recognition device according to any one of supplementary notes 13 to 15 further comprising a learning unit that updates a weighting coefficient of each of the plurality of input nodes of the learning cells by using the plurality of element values.

(Supplementary Note 17)

A learning method of a learning device that comprises a neural network unit having a plurality of learning cells each including a plurality of input nodes to which a plurality of element values based on learning target data are input and an output node that sums the plurality of element values at respective predetermined weights for the plurality of element values and outputs the sum, the learning method comprising:

inputting a plurality of element values based on learning target data to the plurality of input nodes of the learning cells; and in accordance with an output value of each of the learning cells, training the neural network unit by updating weighting coefficients of the plurality of input nodes of the learning cells or adding a new learning cell to the neural network unit.

(Supplementary Note 18)

A recognition method using a recognition device that comprises a neural network unit having a plurality of learning cells, wherein each of the learning cells includes a plurality of input nodes to which a plurality of element values based on recognition target data are input and an output node that sums the plurality of element values at predetermined weights for the plurality of element values and outputs the sum, and each of the learning cells is linked with any of a plurality of categories indicating training information, the recognition method comprising:

inputting a plurality of element values based on recognition target data to the plurality of input nodes of the plurality of learning cells; and based on an output value of each of the learning cells and a category linked with each of the learning cells, recognizing a category to which the recognition target data belongs.

(Supplementary Note 19)

A program executed by a learning device that performs learning based on learning target data, the program causing a computer to function as:

a neural network unit having a plurality of learning cells each including a plurality of input nodes to which a plurality of element values based on learning target data are input and an output node that sums the plurality of weighted element values and outputs the sum; and a unit that, in accordance with an output value of each of the learning cells, updates weighting coefficients of the plurality of input nodes of each of the learning cells or adds a new learning cell to the neural network unit.

(Supplementary Note 20)

A program executed by a recognition device that performs recognition based on recognition target data, the program causing a computer to function as:

a neural network unit having a plurality of learning cells, wherein each of the learning cells includes a plurality of input nodes to which a plurality of element values based on recognition target data are input and an output node that sums the plurality of weighted element values and outputs the sum, and each of the learning cells is linked with any of a plurality of categories indicting training information; and a unit that, based on an output value of each of the learning cells and a category linked with each of the learning cells, recognizes a category to which the recognition target data belongs.

(Supplementary Note 21)

A computer readable storage medium storing the program according to supplementary note 19 or 20.

This application is based upon and claims the benefit of priority from Japanese Patent Application No. 2017-224329, filed on Nov. 22, 2017, the disclosure of which is incorporated herein in its entirety by reference.

REFERENCE SIGNS LIST 10 extraction unit
12 preprocessing unit
20 neural network unit
22, 24 cell
26 learning cell
30 determination unit
40 learning unit
42 weight correction unit
44 learning cell generation unit
50 recognition unit
60 output unit
100 learning/recognition device
200 CPU
202 main storage unit
204 communication unit
206 input/output interface unit
208 system bus
210 output device
212 input device
214 storage device
300 learning device
400 recognition device

What is claimed is:

1. A learning device comprising:
a processor; and
a memory storing program code executable by the processor to:
train a neural network adapted to perform recognition based on image data or voice data,
wherein the processor is to input a plurality of element values based on learning target data to the neural network,
wherein the neural network has a plurality of learning cells each including a plurality of input nodes that perform predetermined weighting on each of the plurality of element values and an output node that sums the plurality of weighted element values and outputs the sum, wherein in accordance with an output value of each of the learning cells, the processor updates weighting coefficients of the plurality of input nodes of each of the learning cells or adds a new learning cell to the neural network, and wherein after the neural network has been trained, the processor is to apply the neural network to the image data or the voice data to perform the recognition on the image data or the voice data.

2. The learning device according to claim 1, wherein the processor adds the new learning cell when a correlation value between the plurality of element values and the output value of each of the learning cells is less than a predetermined threshold value.

3. The learning device according to claim 2, wherein the processor sets each of the plurality of element values as an initial value of a weighting coefficient of each of a plurality of input nodes of the new learning cell.

4. The learning device according to claim 1, wherein the processor updates the weighting coefficient of the plurality of input nodes of the learning cell when a correlation value between the plurality of element values and an output value of each of the learning cells is greater than or equal to a predetermined threshold value.

5. The learning device according to claim 4, wherein when a plurality of the learning cells each having the correlation value that is greater than or equal to the threshold value are present, the processor updates the weighting coefficient of the plurality of input nodes of a learning cell having the largest correlation value.

6. The learning device according to claim 4,
wherein each of the plurality of learning cells is linked with any of a plurality of categories indicating training information, and
wherein the processor updates the weighting coefficient of the learning cell linked with a category to which the input learning target data belongs.

7. The learning device according to claim 4, wherein the learning unit updates the weighting coefficient of each of the plurality of input nodes of the learning cell based on each of the element values input from a corresponding one of the input nodes.

8. The learning device according to claim 2, wherein the correlation value is a likelihood regarding the output value of each of the learning cells.

9. The learning device according to claim 8, wherein the likelihood is a ratio of the output value of each of the learning cells, which is obtained when the plurality of element values are input, to the maximum value of output of each of the learning cells in accordance with a weighting coefficient set for each of the plurality of input nodes.

10. The learning device according to claim 1, wherein the program code is executable by the processor to further:
extract the plurality of element values from the learning target data obtained after a predetermined preprocess is performed.

11. The learning device according to claim 10, wherein the preprocess is a normalization process, a pooling process, or a feature extraction process.

12. The learning device according to claim 1, further comprising a storage is device comprising a working area used for constructing the neural network unit including the plurality of learning cells, wherein the program code is executable by the processor to further:

control an operational process in the neural network; and perform, in parallel, operational processes in the plurality of leaning cells for the plurality of element values in the neural network constructed in the storage device.

13. A recognition device comprising:

a processor; and a memory storing program code executable by the processor to:

apply a neural network to a plurality of element values of recognition target data to perform recognition on the recognition target data, recognition target data being image data or voice data, wherein the neural network has a plurality of learning cells each including a plurality of input nodes that perform predetermined weighting on each of the plurality of element values and an output node that sums the plurality of weighted element values and outputs the sum, wherein each of the plurality of learning cells is linked with any of a plurality of categories indicting training information, wherein the plurality of input nodes of each of the learning cells are configured such that each of the plurality of element values is input at a predetermined weight in accordance with a corresponding category, and wherein based on an output value of each of the learning cells and a category linked with each of the learning cells, the processor recognizes a category to which the recognition target data belongs.

14. The recognition device according to claim 13, wherein the processor recognizes, as a category to which the recognition target data belongs, a category linked with a learning cell having the largest correlation value between the plurality of element values and an output value of each of the learning cells.

15. The recognition device according to claim 13, wherein the processor extracts, out of the plurality of learning cells, a predetermined number of the learning cells in descending order of a correlation value between the plurality of element values and an output value of each of the learning cells and recognizes a category linked with the largest number of the extracted learning cells as a category to which the recognition target data belongs.

16. The recognition device according to claim 13, wherein the program code is executable by the processor to further:

update a weighting coefficient of each of the plurality of input nodes of the learning cells by using the plurality of element values.

17. A learning method of a learning device, comprising:

training a neural network adapted to perform recognition based on image data or voice data, the neural network having a plurality of learning cells each including a plurality of input nodes to which a plurality of element values based on learning target data are input and an output node that sums the plurality of element values at respective predetermined weights for the plurality of element values and outputs the sum, including:

inputting a plurality of element values based on the learning target data to the plurality of input nodes of the learning cells; and in accordance with an output value of each of the learning cells, updating weighting coefficients of the plurality of input nodes of the learning cells or adding a new learning cell to the neural network unit; and after training the neural network, applying the neural network to the image data or the voice data to perform the recognition on the image data or the voice data.

18. A recognition method using a recognition device, comprising:

applying a neural network to perform recognition on recognition target data, the recognition target data being image data or voice data, the neural network having a plurality of learning cells, wherein each of the learning cells includes a plurality of input nodes to which a plurality of element values based on the recognition target data are input and an output node that sums the plurality of element values at predetermined weights for the plurality of element values and outputs the sum, and each of the learning cells is linked with any of a plurality of categories indicating training information, including:

inputting a plurality of element values based on the recognition target data to the plurality of input nodes of the plurality of learning cells; and based on an output value of each of the learning cells and a category linked with each of the learning cells, recognizing a category to which the recognition target data belongs.

19. A non-transitory computer readable storage medium storing a program executed by a learning device to:

train a neural network adapted to perform recognition based on image data or voice data, including:

inputting a plurality of element values based on learning target data to the neural network, wherein the neural network has a plurality of learning cells each including a plurality of input nodes to which a plurality of element values based on the learning target data are input and an output node that sums the plurality of weighted element values and outputs the sum; and in accordance with an output value of each of the learning cells, updating weighting coefficients of the plurality of input nodes of each of the learning cells or adds a new learning cell to the neural network unit; and after the neural network has been trained, apply the neural network to the image data or the voice data to perform the recognition on the image data or the voice data.

20. A non-transitory computer readable storage medium storing a program executed by a recognition device:

apply a neural network to perform recognition based on recognition target data, the recognition target data, the recognition target data being image data or voice data, the neural network having a plurality of learning cells, wherein each of the learning cells includes a plurality of input nodes to which a plurality of element values based on the recognition target data are input and an output node that sums the plurality of weighted element values and outputs the sum, and each of the learning cells is linked with any of a plurality of categories indicting training information, including:

inputting a plurality of element values based on the recognition target data to the plurality of input nodes of the plurality of learning cells; and based on an output value of each of the learning cells and a category linked with each of the learning cells, recognizing a category to which the recognition target data belongs.

* * * * *